United States Patent Office 2,901,292
Patented Aug. 25, 1959

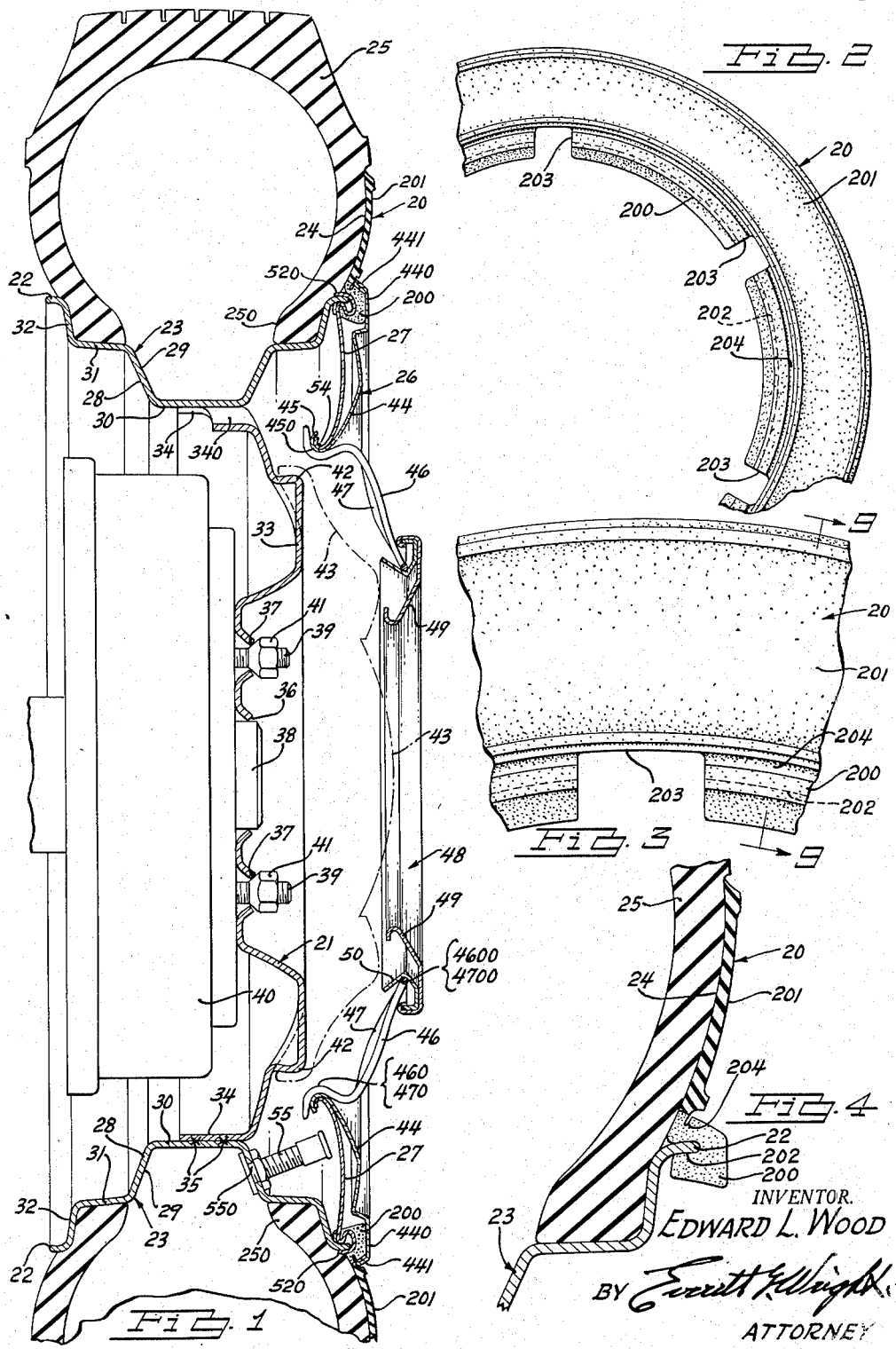

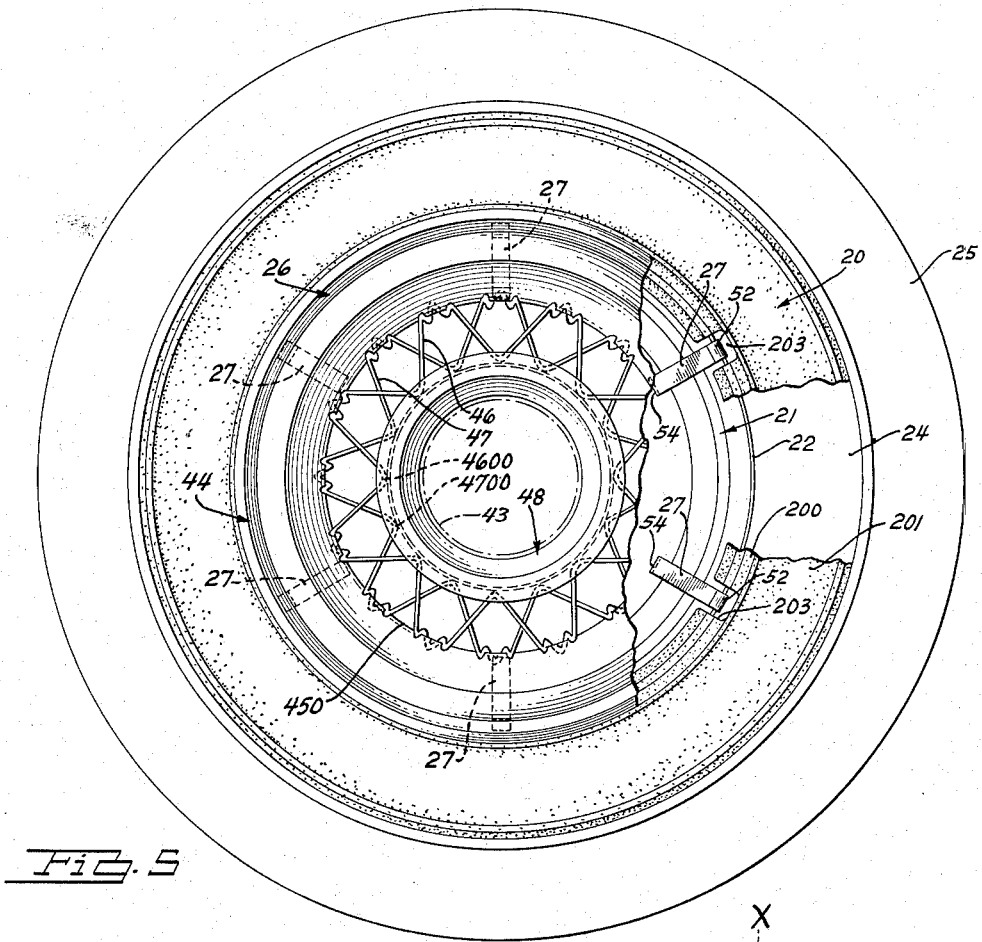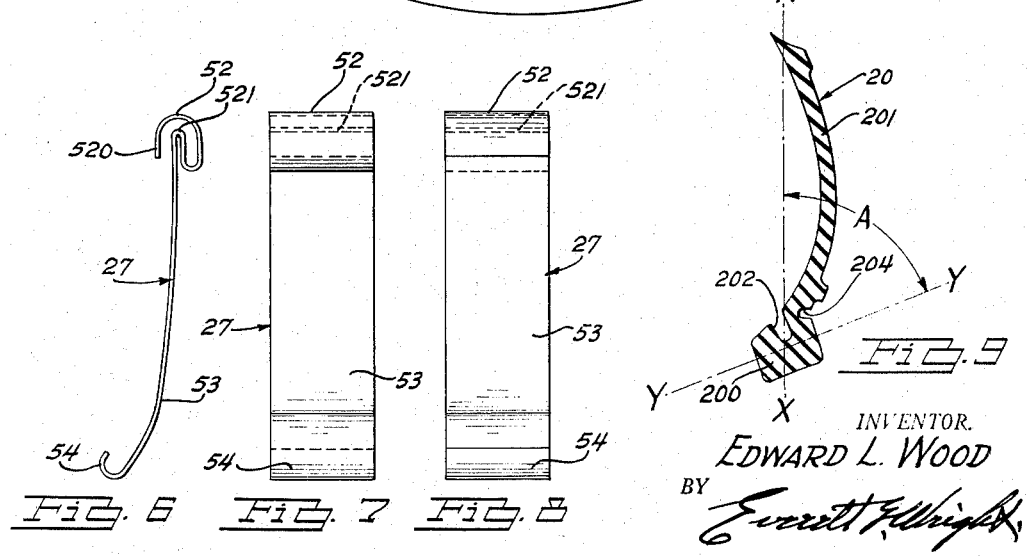

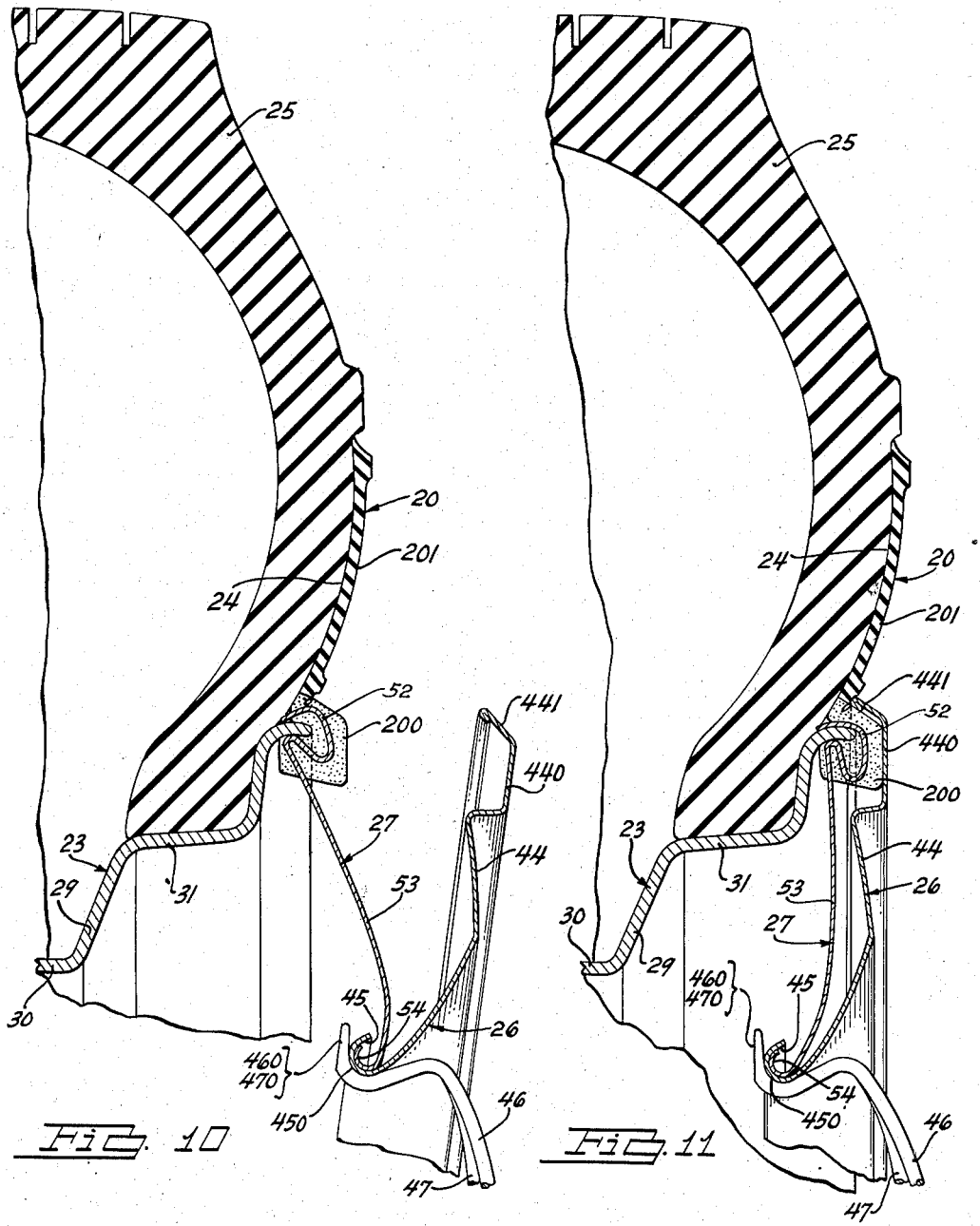

2,901,292

TIRE TRIM

Edward L. Wood, Detroit, Mich., assignor, by direct and mesne assignments, to Gar Wood Industries, Inc., a corporation of Michigan Application March 15, 1956, Serial No. 571,759

6 Claims. (Cl. 301—37)

This invention relates to tire trim of the type readily attachable to the tires of motor vehicles and held in place thereon by wheel trim.

The primary object of the present invention is to provide tire trim in the form of an annular resilient rubber or plastic ring adapted to be telescoped concentrically onto the lip of the wheel rim of a motor vehicle, and, when so positioned onto the lip of the wheel rim, the said tire trim flexes itself against the outer side wall of a tire mounted on the vehicle wheel to provide a white or colored side wall tire effect, all according to the color of the said tire trim.

A further object of the invention is to provide a white or colored tire side wall trim for motor vehicles which is particularly formed to be easily and readily mounted on the vehicle wheel and over the side wall of the tire thereon, and which is held in place by wheel trim axially urged onto the wheel overlying the lip of the wheel trim with the inner periphery of the tire trim thereunder; the said tire trim functioning to cushion the wheel trim and maintain it centrally onto the said wheel.

Other objects of the invention will become apparent by reference to the following detailed description taken in connection with the accompanying drawings, in which:

Fig. 1 is a vertical sectional view through a vehicle wheel and tire having tire trim embodying the invention mounted thereon and fixed in place by wheel trim overlying the inner periphery of said tire trim, the said wheel trim being axially urged onto said wheel by suitable wheel trim securing means.

Fig. 2 is a fragmentary elevational view of a preferred form of tire trim embodying the invention with the inner annular bead thereof disposed in the position to which it is flexed when telescoped onto the lip of a wheel rim.

Fig. 3 is an enlarged fragmentary elevational view of the tire trim shown in Fig. 2.

Fig. 4 is a fragmentary sectional view showing the tire trim telescoped onto the lip of a wheel rim.

Fig. 5 is an elevational view of the wheel shown in Fig. 1 having thereon tire trim embodying the invention concentrically telescoped onto the lip of the wheel with wheel trim overlying the inner periphery of the tire trim, certain portions being broken away to show the tire trim and the wheel trim clip means employed to secure the wheel trim and tire trim onto the wheel.

Figs. 6, 7 and 8 are side, front and rear elevational views of spring clips of the type that may be employed to secure the wheel trim in axial spring loaded relationship onto the wheel over the lip of the wheel rim and overlying the inner periphery of the tire trim.

Fig. 9 is a cross sectional view taken on the line 9—9 of Fig. 3 showing the illustrative embodiment of tire trim as molded with the inner annular bead thereof disposed at an acuate angle with respect to the vertical axis of the wall portion thereof.

Fig. 10 is an enlarged cross sectional view showing the tire trim in place on a vehicle wheel and wheel trim about to be axially urged over the bead of the tire trim.

Fig. 11 is an enlarged cross sectional view similar to Fig. 10 except that the wheel trim has been moved by over-center action of the wheel trim securing clips into an axial pressure position overlying the bead of the tire trim, the said wheel trim firmly securing the tire trim onto the wheel and against the tire wall, and the said tire trim maintaining the wheel trim in concentric cushioned relationship onto the wheel rim.

Referring now to the drawings wherein like numerals refer to like and corresponding parts throughout the several views, the embodiment of the invention disclosed for illustrative purposes comprises a tire trim ring 20 of rubber or other resilient material formed preferably as shown in Fig. 9 having an inner annular bead 200 and an outer annular arcuately formed wall portion 201, the axis Y—Y of the said inner annular bead 200 being disposed on an acute angle A with respect to the vertical axis X—X of the said annular wall portion 201 thereof. The said bead 200 portion has an inwardly disposed groove 202 therein to permit the said tire trim ring 20 to be positioned onto a vehicle wheel 21 with the bead 200 thereof disposed in relatively snug frictional engagement over the lip 22 of the rim 23 of the said vehicle wheel 21. When the tire trim ring 20 is positioned onto the vehicle wheel 21 with the bead 200 thereof telescoped onto the lip 22 of the rim 23 of the said wheel 21, the arcuately formed annular wall portion 201 of the tire trim ring 20 becomes firmly disposed against the side wall 24 of the tire 25 mounted on the vehicle wheel 21, see Fig. 4.

The resilient tire trim ring 20 may be white or any other selected color to match or be compatible with the color of any vehicle having its tires trimmed therewith. The tire trim ring 20 holds itself concentrically onto the lip 22 of the rim 23 of the said vehicle wheel 21, and is firmly held axially thereonto by any suitable wheel trim 26 formed to overlie the bead 200 of the said tire trim ring 20 and which is axially positioned and held onto the vehicle wheel 21 by any suitable means, for example, a plurality of spring clips 27. The said spring clips 27 are connected onto the lip 22 of the wheel rim 23, engage the wheel trim 26, and urge the said wheel trim 26 axially onto the vehicle wheel 21 over the lip 22 of the wheel rim 23 with the bead 200 of the tire trim ring 20 therebetween. The particular wheel trim 26 and the clip means 27 employed to secure it to the vehicle wheel 21 is shown herein for illustrative purposes as a part of the combination of elements used to trim the side wall of a tire mounted on a vehicle wheel, it being understood that wheel trim other than the wheel trim 26 and wheel trim securing means other than the clip means 27 may be employed to hold wheel trim 20 axially onto a vehicle wheel 21 while the said wheel trim 26 simultaneously engages and holds the tire trim 20 onto the vehicle wheel 21 with its annular wall portion 201 disposed firmly against the side wall 24 of the tire 25 mounted on the said vehicle wheel 21.

A typical vehicle wheel 21 is shown in Figs. 1 and 5 with a tubeless tire 25 mounted thereon which may be trimmed by a tire trim ring 20 according to the invention. The said vehicle wheel 21 has a drop center rim 23 composed of a central channel or drop center 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap indicated by the dot and dash lines 43 is sprung, the said nubs 42 retaining the hub cap 43 onto the vehicle wheel 21.

While the particular wheel trim 26 and wheel trim securing clips 27 shown in the drawings as an element of the combination of tire trim ring 20 secured to a vehicle wheel 21 by wheel trim 26 and the wheel trim securing means 27 herein disclosed may be considered preferable, it should be understood that other wheel trim 26 and wheel trim securing means 27 that urges the wheel trim 26 axially onto the wheel in an overlying relationship with respect to the bead 200 of tire trim ring 20 disposed over the lip 22 of the wheel rim 23 may be employed in place of the specific construction shown and described.

The wheel trim 26 shown for illustrative purposes is a wire wheel simulating wheel trim comprising a trim ring 44 having an inner annular groove 45 therein forming an inner rolled annular edge or bead 450 over which is sprung the outer hooked apexes 460 and 470 of staggered multipointed wire star shaped elements 46 and 47 which simulate the spokes of a wire wheel. Over the inner apexes 4600 and 4700 of the star shaped wire spoke simulating elements 46 and 47 is sprung a central ornamental collar or the like 48 preferably formed of two pieces; namely, an outer ornamental ring 49 and an inner spoke engaging ring 50 suitably formed to accommodate and receive the said inner apexes 4600 and 4700 of the star shaped spoke simulating elements 46 and 47. Obviously, any type of wheel trim may be substituted for the wire wheel simulating trim 26 for use with spring securing clips 27 as hereinafter described, provided the substituted wheel trim includes an annular groove similar to the groove 45 therein to receive the said spring clips 27, and provided the wheel trim extends over the bead 200 of the tire trim ring 20.

The spring clips 27 preferably employed to secure the wheel trim 26 onto the vehicle wheel 21 are formed of strip spring steel to provide a reversedly bent and looped head 52 and a curved arm 53 having a wheel trim engaging loop 54 at the outer (radially inwardly disposed) end thereof. The spring clips 27, preferably five or six of them, are sprung tightly onto the lip 22 of the flange 32 of the wheel rim 23 with the transverse edge of the free leg 520 of the looped head 52 thereof disposed in substantial abutment with the bead 250 of the tire 25 mounted on the drop center ring 23 in the manner required according to the type of tire used. The particular tire 25 illustrated is a modern tubeless tire. A valve stem 55 extends through the valve stem aperture 550 provided in the drop center rim channel 28. When the spring clips 27 are properly positioned on the lip 22 of the flange 32 of the wheel rim 23, the outer free leg 520 of the looped head 52 of the spring clips 27 and the inner reversedly bent edge 521 thereof grip opposite sides of the said lip 22 of the wheel flange 32 inwardly from the outer edge thereof.

The reversedly bent and looped head 52 of the spring clip 27 distorts when the spring clips 27 are flexed over-center when urged outwardly from their position shown in Fig. 1 to release the wheel trim 26 from its normal position on the vehicle wheel to which it is axially urged by the said spring clips 27. The extreme end edge of the outer free leg 520 of the looped head 52 of the spring clip 27 and the reversedly bent edge 521 thereof grip the lip 22 of the rim 23 inwardly of the outer end thereof, and, when the spring clip 27 is flexed over-center, the end edge of the outer free leg 520 remains against the top of the lip of the rim while the reversedly bent edge pivots against the bottom of the lip of the rim. When the wheel trim 26 is not engaged by the wheel trim engaging loop 54 of the spring clips 27, the arms 53 thereof are disposed inwardly toward the drop center 28 and the spider 33 of the wheel 21. This is the "unloaded" position of the spring clips 27.

To secure the wheel trim 26 to the vehicle wheel 21, the wheel trim engaging loop 54 at the free end of the curved arm 53 of each of the spring clips 27 is flexed outwardly from its unloaded position, and the said wheel trim engaging loop 54 of each said spring clip 27 is engaged in the inner annular groove 45 of the wheel trim ring 44 of the wheel trim 26. The arms 53 of the spring clips 27 are sufficiently long that, when all or substantially all of them have their wheel trim engaging loop 54 engaged in the inner annular groove 45 of the wheel trim ring 44, the said spring clips 27 have an over-center action and will either hold the wheel trim ring 44 outwardly in axial spaced relationship from the wheel rim 23, as shown in Fig. 10, or, if the wheel trim ring 44 is manually pushed toward the vehicle wheel 21 until an over-center action of the spring clips 27 in the opposite direction takes place, the said spring clips 27 will take over and constantly urge the wheel trim ring 44 with considerable force axially toward and over the lip 22 of the rim 23, see Fig. 11.

The tire trim ring 20 embodying the invention is preferably molded of a relatively live resilient rubber, either white or of any other desired color, and has an annular wall portion 201 and a bead portion 200. The said bead portion 200 is formed with an annular inwardly disposed groove 202 therein of a narrow width and of such depth as to permit the said bead portion 200 of the tire trim ring 20 to be telescoped snugly onto the lip 22 of the rim 23. This groove 202 is sufficiently narrow in width and is of such a depth that the bead 200 of the tire trim ring 20 will engage and hold itself firmly onto the lip of the wheel rim, and thus provide a positive cushioning and centering means for the wheel trim 26 when axially urged thereover. The said bead portion 200 of the tire trim 20 and the outer periphery 260 of the wheel trim 26 are complementarily formed to assure such cushioning and centering action. The bead portion 200 of the tire trim ring 20 is suitably notched out at 203 to avoid interference with the clips 27 employed to secure the wheel trim 26 axially onto the vehicle wheel 21, if such wheel trim securing means is employed. The outer periphery of the tire trim ring 20 is annularly grooved at 204 to permit extreme flexing of the wall portion 201 of the tire trim ring 20 from its molded form shown in Fig. 9 to its on-the-wheel form shown in Fig. 4 ready to receive the outer ornamental ring 49 of the wheel trim 26 axially over the bead portion 200 thereof whereby the wheel trim 26 secures the tire trim 20 axially onto the vehicle wheel 21 and the tire trim 20 centers the wheel trim 26 onto the vehicle wheel 21 and cushions it therefrom.

The trim ring 44 of the wheel trim 26 preferably has an inwardly facing annular channel 440 formed at the outer periphery thereof with the outer annular flange 441 of the said channel 440 formed to contact the tire trim ring 20 at the annular bead 200 thereof when the wheel trim 26 is urged axially by the spring clips 47 or their equivalent onto the vehicle wheel 21. The said wheel trim 26 or its equivalent is thus cushioned with respect to the lip 22 of the wheel rim 23 by the said tire trim bead 200, and, the bead 200 of the tire trim 20 becomes securely fixed in its telescopic relationship over the lip 22 of the wheel rim 23 simultaneously with the said wheel trim 26 being held concentrically onto the said vehicle wheel 21 while the annular wall portion 201 of the tire trim is caused to conform to and become resiliently disposed firmly against the wall of the tire 25 mounted on the vehicle wheel 21.

I claim:

1. Tire trim for the tires of vehicle wheels comprising an annular resilient tire trim ring of a color other than the color of the tire composed of an outer annular wall portion and a relatively narrow annular inner bead portion of substantial thickness in respect to said wall portion having an axially inwardly facing groove therein formed to permit said bead portion to firmly engage and overlie the lip of the wheel rim when telescoped thereonto, the said bead portion and said groove thereon being formed in angular relationship with respect to said wall portion, the said tire trim being annularly grooved at the juncture between said wall and bead portion to provide flexibility thereat and permit rotation of said bead portion in respect to said wall portion when said bead portion is telescoped onto the lip of said rim, and the said wall portion being formed concaved in respect to the wall of the vehicle tire and conformable thereto responsive to the telescoping of the bead portion of the tire trim onto the lip of the wheel rim and the application of axial pressure thereagainst, and means adapted to conform to and overlie the bead portion of said tire trim constantly urging the said bead portion axially onto the lip of said wheel rim.

2. In combination, tire trim for tires of vehicle wheels comprising an annular resilient tire trim ring composed of an outer annular wall portion and an inner bead portion disposed in angular relationship with respect to the said wall portion, the said tire trim being annularly grooved and radially notched to flex readily at the juncture of the said wall and bead portions thereof for engagement of said bead portion onto the readily outstanding lip of the wheel rim when said bead portion is telescoped thereover, and wheel trim including means disposed opposite said notches in said tire trim bead securing said wheel trim with axial pressure onto said wheel over the lip of the rim thereof and over said tire trim bead.

3. In combination with wheel trim and wheel trim securing means fixed onto the rim of a vehicle wheel securing said wheel trim with axial pressure onto said vehicle wheel, tire trim for the tire of said vehicle wheel comprising an annular resilient tire trim ring composed of an annular radially inner bead portion annularly grooved to telescopingly engage the lip of the wheel rim and notched at intervals therearound to accommodate said wheel trim securing means, and an annular radially outer wall portion arcuately formed to flex against the wall of the vehicle tire responsive to axial pressure applied by said wheel trim over said tire trim at said bead, the said tire trim having an annular groove formed in the outer face thereof adjacent said inner bead portion providing relatively sharp flexing of the tire trim at the juncture of the annular wall portion and the annular bead portion when the said inner bead portion is flexed and telescoped onto the lip of the vehicle wheel rim.

4. In combination, tire trim for tires of vehicle wheels comprising an annular resilient tire trim ring composed of an annular radially outer wall portion and an annular radially inner bead portion formed in an acute angular relationship to the said annular wall portion and annularly grooved substantially normal to said acute angle for telescopic engagement with the axially outstanding lip of the wheel rim when said bead portion is flexed to present the said groove therein in axial and radial alignment with the lip of the wheel rim, said annular bead portion having a plurality of radially disposed notches therearound, said outer annular wall portion being arcuately formed to resiliently conform to the wall of the vehicle tire when said inner bead portion is telescopingly engaged on the lip of the wheel rim, and wheel trim including an annular outer peripheral portion formed to overlie the tire trim bead, and wheel trim securing means disposed on said wheel rim opposite said notches in said tire trim bead securing said wheel trim with axial pressure onto said wheel, the said tire trim circumferentially and axially engaging said wheel trim bead whereby to cushion and center said wheel trim onto said wheel.

5. In combination, tire trim for tires of vehicle wheels comprising an annular resilient tire trim ring composed of an outer annular arcuately formed wall portion and an annular inner bead portion formed in angular relationship to said annular wall portion having an annular groove therein disposed normal to the axially inner face of said bead portion, the said tire trim being annularly grooved at the juncture of the said wall portion and the bead portion to permit the said bead portion to be telescoped onto the axially extending lip of the wheel rim when flexed to present the annular groove therein in substantial alignment therewith whereby to cause the said outer annular wall portion to become resiliently positioned against the wall of the vehicle tire, and means constantly applying axial pressure on said bead portion to maintain it fully telescoped onto the lip of the wheel rim.

6. In combination, tire trim for tires of vehicle wheel comprising an annular resilient tire trim ring composed of an outer annular arcuately formed wall portion and an annular inner bead portion formed in angular relationship to said annular wall portion having an annular groove therein disposed normal to the axially inner face of said bead portion, the said tire trim being annularly grooved at the juncture of the said wall portion and the bead portion to permit the said bead portion to be telescoped firmly onto and to overlie the lip of the wheel rim causing said outer annular wall portion to be flexed and resiliently juxtaposed to the wall of the vehicle tire, and wheel trim including an annular outer peripheral portion formed to overlie and register with the outer periphery of the tire trim bead, and means securing said wheel trim axially onto said wheel and over said tire trim bead, the said outer peripheral portion of said wheel trim and the said tire trim bead coacting with each other and the lip of the wheel rim to firmly center and cushion the wheel trim onto said wheel and firmly hold said tire trim wall against the wall of said tire.

References Cited in the file of this patent

UNITED STATES PATENTS

| 1,968,076 | Goodyear et al. | July 31, 1934 |
| 2,737,422 | Barnes | Mar. 6, 1956 |
| 2,819,119 | Perrin | Jan. 7, 1958 |

FOREIGN PATENTS

| 1,061,278 | France | Nov. 25, 1953 |